United States Patent Office 2,773,865
Patented Dec. 11, 1956

2,773,865
VAPOR DRYING OF CELLULOSE

Earl Ralph Purchase, Waynesboro, Va., assignor to E. I. du Pont de Nemours and Company, Wilmington, Del., a corporation of Delaware No Drawing. Application December 14, 1951,
Serial No. 261,757

16 Claims. (Cl. 260—229)

This invention relates to the treatment of cellulosic materials intended for esterification. More particularly, it refers to a novel process for the removal of moisture due to water from cellulose concurrently with the supply of organic acid thereto.

The cellulose cotton linters or wood pulp, supplied as a raw material to manufacturers of cellulose ester fibers, is usually moist due to the presence of from 5 to 10% water. Since the acid anhydride reactant employed in the esterification combines with water, its use upon such raw cellulose is undesirable. Not only is acid anhydride lost by consumption in the simultaneously competing reaction with water, but this competing reaction is exothermic in character which causes spot heating due to inadequate heat dissipation. A deleterious degradation of the cellulose molecule results which causes undesirable characteristics in the processed fiber.

In the prior art processes, the moisture due to the presence of water in the raw cellulose is either removed by vaporization or replaced by chemical reaction or solvent extraction. The removal of substantially all of the moisture by vaporization, such as by air drying, is unsatisfactory since upon esterification a gelatinous product is formed which is difficult to filter. Where such a drying procedure is the practice, it is often necessary to follow it with a "wetting-out" period before esterification. Concentrated organic acid is used for this purpose. The replacement procedure may be accomplished by reaction with liquid or vaporous acid anhydride which may be diluted with the corresponding concentrated organic acid to facilitate absorption by the cellulose and the dissipation of heat. Thus, moisture due to water present is converted into acid. Obviously, this procedure also consumes the expensive acid anhydride reaction component. Another replacement procedure involves solvent extraction. For efficient operation, such a process necessarily requires water-solvent separation and recovery of the solvent.

It is an object of the present invention to provide a novel process for the removal of moisture due to water from cellulose concurrently with the supply of organic acid thereto.

Another object is to provide a process for the removal of moisture due to water in cellulose which avoids consumption of acid anhydride.

Another object is to provide a process for the removal of moisture due to water in cellulose which does not require solvent separation and recovery.

A further object is to provide a process for the removal of moisture due to water from cellulose without rendering it unsuitable for the manufacture of cellulose acetate fiber.

A still further object is to provide a process for the preparation of cellulose suitable for use in the manufacture of cellulose acetate fibers which avoids the separate steps of drying and wetting out.

Other objects of this invention will be apparent from the discussion that follows.

According to the process of this invention, raw cellulose in sheet or fragmented form is treated with a flow of air having a low water vapor and a high organic acid vapor content. By passage of this gaseous mixture over or through the raw cellulose, a removal of moisture due to water therefrom occurs concurrently with the deposit of organic acid therein. Thus, the moisture formerly present in the cellulose is picked up by the air stream. On the other hand, the organic acid vapor fed in with the air stream is retained by the cellulose. An acid-bearing cellulose is thereby formed which is substantially free of moisture due to water. It is amenable to esterification by the conventional methods. By regulation of contact period and gas composition it is possible to completely exhaust the air of acid vapor during the treatment, making acid recovery unnecessary.

The amount of contact between the gas stream and the initial raw cellulose, which is necessary to remove substantially all the moisture due to water, depends primarily on the amount of moisture present, the extent of surface contact available and the relative humidity of the treating gas. This is a matter which can be determined empirically under any given set of conditions. While there is evidence that the presence of the acid vapor may hasten the drying operation, it has been found that the concentration of the acid vapor above the value necessary to adequately supply the cellulose has little or no effect upon the rate of water removal. Thus, it is not necessary to maintain a particularly high acid vapor concentration. As low a concentration as 60% of saturation is considered operable under practical conditions. Higher concentrations, up to 100% saturation, may be employed without deleterious effects. It is possible, and sometimes desirable, to supply more acid to the raw cellulose than is equivalent to the water withdrawn. It is essential to the operation of the process that the acid vapor supplied to an air stream which has been dried be very low in water content. As low a water content as practicable is desired. Acid containing as high as 0.2% water has been successfully employed. Acid of higher water content very rapidly increases the final moisture content of the cellulose. This precaution of using acid low in water content is unnecessary when the water vapor is removed from the air stream subsequent to its saturation with acid. The removal of water from the air may be accomplished by any of the conventional methods such as condensation by refrigeration, passage through concentrated sulfuric acid or through a calcium chloride tower, or the like.

Although the process of this invention may be practiced very satisfactorily at room temperature, lower, as well as higher, temperatures may be employed. The use of gases at the higher temperature is effective in increasing the drying rate.

The acid-bearing cellulose resulting from treatment in accordance with the present invention acetylates rapidly and uniformly to a clear, filterable, high viscosity gum when reacted with acid anhydride in the presence of sulfuric acid catalyst. The material is likewise amenable to other acetylation procedures, such as acetylation using basic catalysts. While the examples are limited to acetylation, it is understood that acid anhydrides other than acetic, such as propionic, butyric, isobutyric, trimethylacetic, crotonic, 2-ethylbutyric, nonanoic, and benzoic may be employed.

The cellulosic material used in the practice of the present invention can be any of the common types of cellulose such as cotton, wood pulp, regenerated cellulose and the partially substituted cellulose derivatives. The physical form is not important as long as it can be permeated by the gaseous stream. Even where ground cellulose is employed, the process has been found beneficial.

Example I

A sheet of wood pulp 0.0625 inch thick, containing 8.5% moisture due to water, is suspended in an enclosure tube 3 feet high having a rectangular internal cross-section of 1 x 7 inches. Air, at a temperature of 29° C., is dried to a water vapor content of 3 milligrams per liter. This corresponds to a relative humidity of 7.5%. The air stream is then passed through a saturating tank containing glacial acetic acid, said acid having a water content of about 0.1%. After becoming substantially saturated with acetic acid vapor, the air is led into the bottom of the pulp sheet enclosure tube at a velocity of 500 feet per minute. After 20 minutes of such treatment, the pulp sheet is observed to have a water content of 1.7% and an acetic acid content of 21% based on the total weight. The pulp so treated is easily and satisfactorily acetylated in the conventional manner.

*Example II*

Air, at room temperature, is passed through two scrubbers containing concentrated sulfuric acid. The water vapor content of the scrubbed air is just under 0.8 milligram of water vapor per liter of air. This corresponds to a relative humidity of slightly less than 5%. The air is then passed through a preheated tube which leads into an acetic acid saturator. The saturator is maintained at 62.5° C. The treated air is 80% saturated with acetic acid vapor at the saturator temperature. These heated vapors are then led through a tube 12 feet long and 1 inch in diameter which has been filled with cotton linters having a moisture content due to water of 8.6%. The flow rate through the loosely packed linters is maintained at 2.6 liters per minute for 20 minutes. Withdrawn linters analyzed to a water content of 0.5% and an acetic acid content of 20%. They are satisfactorily acetylated by treatement with acetic anhydride in the presence of sulfuric acid as a catalyst.

*Example III*

Air, at room temperature, is passed through a scrubber containing concentrated sulfuric acid. The water vapor content is reduced from 8.5 milligrams of water vapor per liter of air to about 0.85 milligram of water vapor per liter of air. The relative humidity of the effluent air corresponds to 5% at 20° C. It is then led through two consecutive acetic acid saturators which are maintained at 45° C. The air stream so treated is approximately 95% saturated with acid vapor. It is then fed into the bottom of a 1 inch diameter vertical cylinder half full of fluffy fragments of wood pulp having a moisture content due to water of 9.4%. This system is water-jacketed at 48° C. Air flow at the rate of 18 liters per minute stirs the pulp fragments vigorously, suspending them throughout the cylinder volume. In one minute, the water content of the wood pulp falls to 1.0%. Two minutes further drying reduces the water content to about 0.5%. Each gram of pulp captures from 0.1 to 0.2 gram of acetic acid from the drying air. The treated pulp yields to acetylation by the conventional methods.

*Example IV*

Air, at approximately 20° C., is dried to a water vapor content of about 0.2 milligram of water vapor per liter of air by passage through a calcium chloride tower. This represents a relative humidity of slightly over 1%. The air is then passed through glacial acetic acid containing about 0.1% water and finally through a bed of loosely packed wood pulp sheet which has been torn into pieces roughly square, one to two inches on a side. At the end of 20 hours the water content of the cellulose is 0.33% and the acetic acid content is 26%. The dried pulp can be acetylated by the conventional process.

As indicated in the above examples, the amount of acetic acid remaining in the cellulose is appreciable. The resulting intimate contact between acid and cellulose renders unnecessary the usual period of wetting out the cellulose with acetic acid before acetylating it. Under properly controlled conditions, complete removal of acetic acid vapor from the air occurs. This greatly facilitates use of the process, as the air leaving the dried cellulose contains only water and may be vented safely to the atmosphere.

The humidity of the treating air at the operating temperature may be as low as desired, depending upon how nearly anhydrous the cellulose is to be made. A water vapor content of 1% relative humidity or somewhat less, depending on operating conditions, is considered a satisfactory working limit. The process is capable of satisfactorily removing substantially all moisture due to water from the forms of cellulose used in the manufacture of acetate fibers. So long as adequate acid vapor is supplied to concurrently replace the water removed, no adverse effect upon acetylation is discernible.

Many equivalent modifications within the scope of the disclosure will be apparent to those skilled in the art without a departure from the inventive concept.

What is claimed is:

1. A process for the removal of moisture due to water from raw cellulose concurrently with the supply of organic acid thereto, which comprises contacting the cellulose with a stream of air having a relative humidity of no more than about 7.5% which is rich in the vapors of lower aliphatic carboxylic acid until substantially all of the said moisture due to water present in the said cellulose has been replaced by the said acid.

2. The process in accordance with claim 1 wherein the organic acid is acetic acid.

3. The process in accordance with claim 1 wherein the raw cellulose is cotton linters.

4. The process in accordance with claim 1 wherein the raw cellulose is wood pulp.

5. A process for the removal of moisture due to water from raw cellulose concurrently with the supply of acetic acid thereto which comprises contacting the cellulose with a stream of air which has been dried to a low humidity and mixed with vapors of acetic acid by passage of the said air through a column of acetic acid until substantially all of the said moisture due to water present in the said cellulose has been replaced by the said acid.

6. The process of claim 5 wherein the acetic acid contains no more than about 0.2% moisture due to water.

7. The process of claim 5 wherein the air is dried by passage through a column of concentrated sulfuric acid.

8. The process of claim 5 wherein the stream of air contains at least about 60% of saturation of acetic acid.

9. The process of claim 5 wherein the air is dried prior to mixing with the acid vapors.

10. The process of claim 9 wherein the cellulose is cotton linters.

11. The process of claim 9 wherein the cellulose is wood pulp.

12. The process of claim 11 wherein the wood pulp contains from about 5 to about 10% water.

13. A process for the removal of moisture due to water from raw cellulose concurrently with the supply of acetic acid thereto which comprises contacting the cellulose with a stream of air which has been dried to a low humidity by passage through a column of concentrated sulfuric acid and mixed with vapors of acetic acid by passage of the said air through a column of acetic acid.

14. The process of claim 13 wherein the cellulose is cotton linters.

15. The process of claim 13 wherein the cellulose is wood pulp.

16. The process of claim 13 wherein the wood pulp contains from about 5 to about 10% water.

References Cited in the file of this patent

UNITED STATES PATENTS

| | | |
|---|---|---|
| 526,201 | Saulmann | Sept. 18, 1894 |
| 1,831,101 | Dreyfus | Nov. 10, 1931 |
| 2,478,396 | Hincke et al. | Aug. 9, 1949 |

FOREIGN PATENTS

| | | |
|---|---|---|
| 263,938 | Great Britain | Jan. 6, 1927 |